Dec. 20, 1949     M. EHLINGER     2,491,960

AUTOMATIC FEED REGULATOR FOR BOILERS

Filed Dec. 26, 1945

INVENTOR,

Marcel Ehlinger

BY *Glascock Downing Beckley*

ATTORNEYS

Patented Dec. 20, 1949

2,491,960

UNITED STATES PATENT OFFICE 2,491,960

AUTOMATIC FEED REGULATOR FOR BOILERS

Marcel Ehlinger, Paris, France

Application December 26, 1945, Serial No. 637,249
In France February 8, 1945

3 Claims. (Cl. 122—451)

1

Regulators with continuous draining are known in which the fluid issuing from the expansion coil, which is a mixture of water and steam, the outflow of which varies with the level of the liquid in the boiler, is used to set through the medium of its weight, or the force of its jet, or the like, on a member causing the quantity of water supplied to the boiler, to vary.

The present invention has for its object improvements in this process, which consists in the use of this mixture, during expansion of the steam admitted with the draining as a servomotor fluid, and the adjustment of said fluid being controlled by the very outflow of the draining mixture; the invention also relates to devices for carrying said process into practice.

Thus, with the instantaneity of the impulse there is obtained the possibility of exerting a greater stress on the member to be manipulated in order to vary the quantity of water necessary for the boiler.

According to the invention a mixture of water and steam is tapped from the boiler and then brought by a serpentine coil to a deformable chamber whose capacity varies dependent on the pressure therein; for instance, fluid is jetted into the deformable chamber and the jet acts on a movable cut-off or obturator which through its action controls the discharge of fluid toward the air and thus makes the pressure vary inside the deformable chamber to vary its size and capacity and which variations of size or capacity are utilized to actuate the means controlling the water feed to the boiler.

According to an essential characteristic of the invention, the device which permits tapping a mixture of water and steam from the boiler, includes a pipe immersed below the lowest level of the water in the boiler, a vessel surrounding this pipe and open to the steam above the highest level of the water in the boiler, and an orifice in the lower part of this vessel whereby the water may enter and fall freely owing to the sufficiently large cross sectional area of this vessel. Thus, the proportion of water primed in the mixture of water and steam varies with the head of the water situated in the boiler above said orifice. If the enclosed space surrounding the end of the immersed pipe below the lowest level of the water was of too small a cross sectional area, the pressure would not be uniform therein and the liquid could be primed by suction instead of first of all falling freely to the bottom of the enclosed space and then being primed simultaneously with the steam.

2

Figure 1:
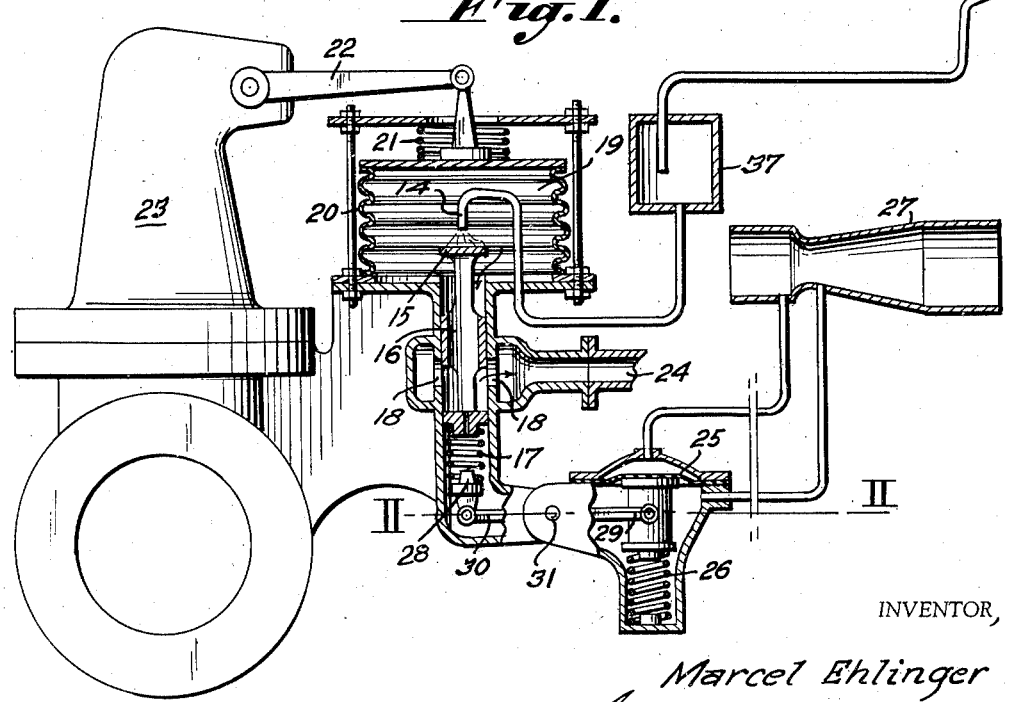
Figure 1 is a vertical section of the regulator according to the invention.

In Fig. 1, the water-level 1 in the body 2 of the boiler varies between the levels 3 and 4.

As shown in the drawings the steam intake device is composed as follows:

The discharge pipe 5 is immersed in the steam in the midst of a vessel 6 to which it is attached by lugs or a spider 7 and which vessel has an orifice 8 in the lower part thereof through which freely flows water in variable quantity, according to its level in the boiler. The vessel 6 has a closed bottom and is open to the steam at its top and has a greater cross sectional area than the orifice 8 so that the water admitted through orifice 8 is not drawn through said orifice by the steam but freely falls into the lower part of said vessel 6, where it is drawn through tube 5 by and with the steam. Pipe 5 discharges steam and water towards the serpentine coil 9 which serves, by the loss of head it causes, to remain within the admissible limits of outflow and which can be, so to speak, instantaneously traversed.

Effectively, the coil 9 creates a pressure drop by friction; the pressure decreased by such friction is exerted in a chamber 19 upon a resilient diaphragm 20; such a diaphragm would be incapable of resisting the high pressures prevailing in the boiler.

The steam intake device is conveniently hung or carried in the boiler by the tube or pipe 5 that is fastened through a cover plate 10 closing an opening in the boiler wall, and through which opening said device can be introduced into the boiler. It is surrounded by a wire-netting or a perforated sheet metal plate 11 of such mesh that no foreign body can enter the coil and obstruct it.

If the level is to be adjusted within close limits, the level in the vicinity of vessel 6 is protected from tumultuous boiling by a casing 12 attached to pipe 5 by a spider or lugs 13.

When the level varies, in the boiler, a quantity of water mixes with the steam sent through the coil, which is a function of the height $h$ above orifice 8, and therefore a function of the water level.

This device is more advantageous, than an arrangement which consists in causing the outflow of steam or water to vary, by means of a float throttling at the inlet of the coil, a quantity of said fluids variable with the water level.

The fluid issuing from the coil at 14 impinges by a jet at considerable and suitably chosen speed on to the surface 15 of the obturator 16, balanced by the pressures and urged to upper position by a spring 17. The jet is more or less abundant according to the level and it causes the obturator 16 to be correspondingly moved or driven in to a more or less great distance, this movement covering or uncovering the ports 18 perforated in the distributing cylinder. The steam escaping from the jet then spreads out, for instance into the chamber 19 including the resilient diaphragm 20 which is balanced, in its turn, if need be, by the spring 21. The upper portion of which chamber moves axially drawing along with it the lever 22 actuating the cock 23, which is preferably balanced, and which controls the supplying of the boiler with feed water. Finally, the steam issues through 24 from the apparatus into a chamber at any pressure, usually at atmospheric pressure, in which it can be condensed in order to be recovered and sent for instance to the feed tank.

When the level varies, under the action of the variable jet, the obturator therefore causes a variation of pressure in chamber 19, resulting in a displacement of its upper portion and thereby the connection with the adjusting cock 23 is so chosen that its action on cock 23 causes the variation, in the suitable direction, of the water supplied.

The bearing surface of spring 17 of the obturator is rigid with an auxiliary diaphragm 25 balanced by a spring 26 and which assumes a position that is a function of the partial vacuum prevailing between the inlet and the neck of a venturi 27 and through which passes the steam produced by the boiler. The position of the diaphragm consequently reverberates at the bearing surface 28 of spring 17 by a set of levers 29 and 30 and spindle 31 with the necessary stuffing-boxes, not shown in detail.

A variation of the speed of operation of the boiler produces an immediate variation of the quantity of water supplied to the boiler. The connections are devised in such a manner that the supply of water follows the demand for steam.

For instance, an increase of outflow of the boiler produces an increase of the partial vacuum in the neck of the venturi, relatively to the inlet. The diaphragm 25 lowers causing the lifting of the base of spring 17 and, consequently, the lifting of obturator 16. The pressure in chamber 19 lowers and diaphragm 20 lowers under the action of spring 21, which causes the opening of supply cock 23.

Instead of connecting the pressures prevailing on either side of the diaphragm to a venturi, they can be connected before and after a resistance of any kind, for instance the superheater.

It frequently happens that the pressure ensured by the supply pump, in front of the supply cock 23, is not constant, owing to the characteristic curve of the supply pump and the fluctuations of the pressure of the boiler. This has for effect to cause a quantity of water to pass through cock 23, which, for a given position of the adjusting needle, can assume various values. Fluctuations of the water level in the boiler result therefrom.

Figure 2:
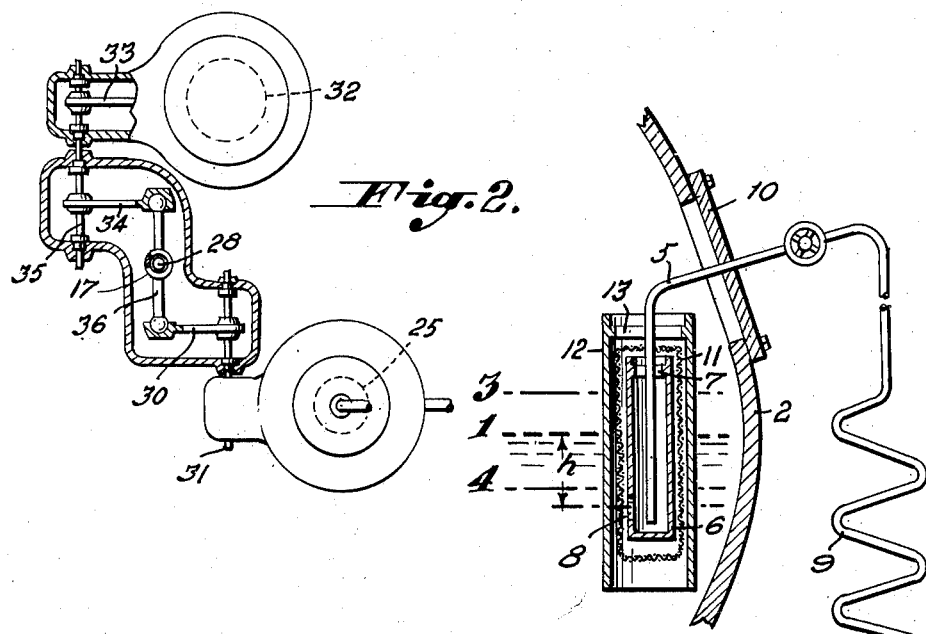
Figure 2 is a horizontal section of a modification.

In order to avoid this troublesome phenomenon, in particular for certain pump features or for great variations in the working speed or pressure, a diaphragm 32, shown in Fig. 2, similar to diaphragm 25, is connected to the up-side and down-side pressures of the adjusting cock. The displacement of said diaphragm 32 draws along with it, by means of a set of levers 33 and 34, rigid with spindle 35 and a suitable stuffing-box, the bearing surface 28 of spring 17.

Assuming, for instance, that the boiler operates at reduced speed, the overpressure between the up side and down side of cock 23 has increased relatively to normal operation. An increase of the water outflow results therefrom which is not justified by the working speed of the boiler, on the contrary. Diaphragm 32 then lowers causing by its movement the lowering of the bearing surface 28 of spring 17 and that of obturator 16, which has for effect to tend to close the supply cock.

It is to be noted that the bearing surface 28 is both rigid with the movements of diaphragms 25 and 32. This is obtained by the stay-member 36 connecting, by ball-and-socket joints, the levers 30 and 34, as shown in Fig. 2.

If the level resulting from the extraction of steam and the supply of water is not correct, the blow-off re-establishes it through the medium of the obturator at the suitable position as above indicated.

It is advantageous to provide in the path of the fluid between the coil and jet, a tank 37 (Fig. 1).

The regulator forming the subject-matter of the invention is capable of being placed on any liquid tank whatever in presence of gas and the level of which is to be adjusted.

The property of said regulator is that of being extremely rapid and constant.

What I claim as my invention and desire to secure by Letters Patent is:

1. A feed regulator for boilers comprising means to control the supply of water to the boiler, means to tap a mixture of water and steam under pressure from the boiler at a definite level, a coil arranged outside the boiler and through which said mixture of water and steam flows, a resiliently deformable chamber whose capacity varies in dependency on the pressure prevailing therein, said coil having an outlet disposed within said chamber and through which the mixture jets, said chamber having an outlet therein, a movable obturator adapted to close the outlet in the chamber and disposed in position to be actuated by the jet and movable due to the force exerted by the jet issuing from said coil outlet, a spring acting upon said obturator and urging same to open said outlet in the chamber, said obturator controlling the flow through the outlet in the chamber toward the atmosphere of the fluid admitted into the deformable chamber and thus modifying the pressure within said chamber and means governed by said variations in the capacity of the deformable chamber actuating the aforesaid water-feed control means.

2. A feed regulator as claimed in claim 1 wherein the means for tapping a mixture of water and steam from the boiler comprises a pipe immersed at a fixed level below the lowest desired level of the water in the boiler, a vessel surrounding said pipe and extending above the highest desired level of the water in the boiler and open to the steam above the water level and said vessel having an orifice in the lower part thereof so that the water in the boiler can enter and mix with the steam in the vessel to be withdrawn through the pipe.

3. A feed regulator as defined in and by claim 1 wherein pressure responsive means are provided for adjusting the position of said spring.

MARCEL EHLINGER.

REFERENCES CITED

The following references are of record in the file of this patent:

UNITED STATES PATENTS

| Number | Name | Date |
|---|---|---|
| 334,691 | Crawford | Jan. 19, 1886 |
| 1,172,476 | Melcher | Feb. 22, 1916 |
| 1,697,342 | Campbell | Jan. 1, 1929 |